United States Patent
Valluri et al.

(10) Patent No.: US 8,942,106 B2
(45) Date of Patent: Jan. 27, 2015

(54) METHOD AND APPARATUS FOR ROUTE OPTIMIZATION ENFORCEMENT AND VERIFICATION

(71) Applicant: Cisco Technology, Inc., San Jose, CA (US)

(72) Inventors: Vamsidhar Valluri, Fremont, CA (US); Kerry Lynn, Sudbury, MA (US); Martin Djernaes, Sa Ramon, CA (US); Dana Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/901,833

(22) Filed: May 24, 2013

(65) Prior Publication Data

US 2013/0258852 A1    Oct. 3, 2013

Related U.S. Application Data (63) Continuation of application No. 11/297,280, filed on Dec. 8, 2005, now Pat. No. 8,456,987.

(60) Provisional application No. 60/679,184, filed on May 9, 2005.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/803* | (2013.01) |
| *H04L 12/24* | (2006.01) |
| *H04L 12/721* | (2013.01) |

(Continued)

(52) U.S. Cl.
CPC .......... *H04L 47/122* (2013.01); *H04L 41/0866* (2013.01); *H04L 45/70* (2013.01); *H04L 45/00* (2013.01); *H04L 45/04* (2013.01); *H04L 45/123* (2013.01); *H04L 45/125* (2013.01); *H04L 47/125* (2013.01); *H04L 12/24* (2013.01); *H04L 45/02* (2013.01); *H04L 45/12* (2013.01)
USPC ....................................................... 370/237

(58) Field of Classification Search
None
See application file for complete search history.

(56) References Cited

U.S. PATENT DOCUMENTS

| | | | |
|---|---|---|---|
| 6,728,723 B1 * | 4/2004 | Kathail et al. ........................ 1/1 |
| 6,871,265 B1 | 3/2005 | Oren et al. | |

(Continued)

OTHER PUBLICATIONS

"NetFlow Services Solutions Guide", Oct. 2004, pp. 1-72, Cisco Systems, Inc.

(Continued)

*Primary Examiner* — Christopher Crutchfield
(74) *Attorney, Agent, or Firm* — Novak Druce Connolly Bove + Quigg LLP (57) ABSTRACT

In one embodiment, a best exit from an autonomous system (AS) for a controlled prefix is determined. A network device of the AS influences a route for the controlled prefix to be over the best exit. Traffic statistics for the controlled prefix are selected. The network device verifies, based on the traffic statistics, whether the influence has caused at least a configured amount of traffic for the controlled prefix to be over the best exit. When at least the configured amount of the traffic is not directed over the best exit, the network device further influences the route for the controlled prefix to be over the best exit.

20 Claims, 4 Drawing Sheets

(51) Int. Cl.
  *H04L 12/701* (2013.01)
  *H04L 12/715* (2013.01)
  *H04L 12/751* (2013.01)
  *H04L 12/729* (2013.01)

(56) References Cited

U.S. PATENT DOCUMENTS

| | | | |
|---|---|---|---|
| 6,931,441 B1* | 8/2005 | Roden et al. | 709/223 |
| 6,938,095 B2 | 8/2005 | Basturk et al. | |
| 6,973,034 B1 | 12/2005 | Natarajan et al. | |
| 7,142,541 B2 | 11/2006 | Kumar et al. | |
| 7,554,930 B2* | 6/2009 | Gaddis et al. | 370/254 |
| 2003/0204619 A1* | 10/2003 | Bays | 709/238 |
| 2004/0172553 A1* | 9/2004 | D'Souza et al. | 713/200 |
| 2005/0152339 A1* | 7/2005 | Scott et al. | 370/352 |
| 2006/0004792 A1 | 1/2006 | Lyle et al. | |
| 2006/0067248 A1 | 3/2006 | Netravali et al. | |
| 2006/0203747 A1 | 9/2006 | Wright et al. | |
| 2007/0140128 A1 | 6/2007 | Klinker et al. | |

OTHER PUBLICATIONS

"NetFlow v9 Export Format", Cisco IOS Release, 2003, pp. 1-22, Cisco Systems, Inc.

Perlman, Radia, "Interconnections Second Edition: Bridges, Routers, Switches, and Internetworking Protocols", Sections 12.1-12.3 pp. 299-321, Addison Wesley Longman, Inc. 2000.

Rekhter, Y. et al., RFC 1771, "A Border Gateway Protocol 4 (BGP-4)", Network Working Group, Mar. 1995, pp. 1-54.

Selecting Best Path, Dec. 5, 2008, Juniper Publication, http://www.juniper.netltechpubs/ software/ erx/erx41x/swconfig-routing-vol2/html/bgp-config10.html, retrieved from web archive.

U.S. Appl. No. 11/113,629, filed Apr. 25, 2005, entitled Active Probe Path Management, by Blair et al.

U.S. Appl. No. 11/113,582, filed Apr. 25, 2005, entitled Active Probe Target Management, by Metzger et al.

U.S. Appl. No. 10/980,550, filed Nov. 3, 2004, entitled Method and Apparatus for Automatically Optimizing Routing Operations at the Edge of a Network, by Shah et al.

U.S. Appl. No. 60/679,184, filed May 9, 2005, entitled Systems and Methods for Use With Optimized Edge Routing, by Blair et al.

* cited by examiner

METHOD AND APPARATUS FOR ROUTE OPTIMIZATION ENFORCEMENT AND VERIFICATION

RELATED APPLICATION

This application is a continuation of U.S. patent application Ser. No. 11/297,280, entitled METHOD AND APPARATUS FOR ROUTE OPTIMIZATION ENFORCEMENT AND VERIFICATION, filed by Vamsidhar Valluri et al. on Dec. 8, 2005, which claims the benefit of U.S. Provisional Application Ser. No. 60/679,184, entitled SYSTEMS AND METHODS FOR USE WITH OPTIMIZED EDGE ROUTING, filed by Blair et al. on May 9, 2005, the contents of both of which are hereby incorporated in their entirety.

BACKGROUND OF THE INVENTION

1. Field of the Invention

The present invention relates to computer networks and more particularly to enforcement and verification of route optimization decisions in a computer network.

2. Background Information

A computer network is a geographically distributed collection of nodes interconnected by communication links and segments for transporting data between end nodes, such as personal computers and workstations ("hosts"). Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or an area is generally referred to as a "domain," and a node that interconnects different domains together is generally referred to as a "border node" or "border router." In general, the autonomous system may be an enterprise network, a service provider or any other network or subnetwork. Furthermore, the autonomous system may be multi-homed, i.e., comprising a plurality of different peer (neighboring) connections to one or more other routing domains or autonomous systems.

The administrative entity of an AS typically configures network nodes within the AS to route packets using predetermined intradomain routing protocols, or interior gateway protocols (IGPs), such as conventional link-state protocols and distance-vector protocols. These IGPs define the manner with which routing information and network-topology information is exchanged and processed in the AS. Examples of link-state and distance-vectors protocols known in the art are described in Sections 12.1-12.3 of the reference book entitled *Interconnections, Second Edition*, by Radia Perlman, published January 2000, which is hereby incorporated by reference as though fully set forth herein.

Link-state protocols, such as the Open Shortest Path First (OSPF) protocol, use cost-based routing metrics to determine how data packets are routed in an AS. As understood in the art, a relative cost value may be associated with a network node to determine the relative ease/burden of communicating with that node. For instance, the cost value may be measured in terms of the average time for a data packet to reach the node, the amount of available bandwidth over a communication link coupled to the node, the monetary cost per amount of bandwidth, etc. Network nodes in the AS generate a set of cost values associated with their neighboring nodes. Each set of cost values is then "advertised" (flooded) to the other interconnected nodes. Using the advertised cost values, each node can generate a consistent "view" of the network topology, thereby enabling the nodes to determine lowest-cost routes within the AS.

Distance-vector protocols, such as the Interior Gateway Routing Protocol (IGRP) or Routing Information Protocol (RIP), use distance-based routing metrics to determine how data packets are routed in an AS. A network node may associate a distance metric with each of its interconnected nodes in the AS. For example, the distance metric may be based on, e.g., a number of hops between a pair of nodes or an actual distance separating the nodes. Operationally, the network nodes determine distances to reachable nodes in the AS and communicate these distance metrics to their neighboring nodes. Each neighboring node augments the received set of distance metrics with its own distance measurements and forwards the augmented set of metrics to its neighbors. This process is continued until each node receives a consistent view of the network topology.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

A plurality of interconnected ASes may be configured to exchange routing and reachability information among neighboring interdomain routers of the systems in accordance with a predetermined external gateway protocol, such as the Border Gateway Protocol (BGP). The BGP protocol is well known and generally described in Request for Comments (RFC) 1771, entitled *A Border Gateway Protocol 4 (BGP-4)*, published March 1995, which is hereby incorporated by reference in its entirety. An adjacency is a relationship formed between selected neighboring (peer) routers for the purpose of exchanging routing information messages and abstracting the network topology. The routing information exchanged by BGP peer routers typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. To implement the BGP protocol, each AS includes at least one border node through which it communicates with other, interconnected ASes. Because data packets enter and exit the AS through the border node, the border node is said to be located at the "edge" of the AS.

The BGP protocol generally facilitates policy-based routing in which an administrative entity places restrictions on inter-AS routing operations. For example, the administrator of a company's AS may employ a BGP routing policy where network traffic leaving the AS is not permitted to enter a competitor's network, even if the competitor provides an otherwise acceptable routing path. BGP policies typically do not depend on the cost-based or distance-based routing metrics used with interior gateway protocols. Instead, the BGP policies rely on AS path-vector information. More specifically, the BGP protocol enables a plurality of interconnected ASes to exchange network topology information. Using this topology information, each AS can derive "paths" to the other reachable ASes, each path defining a logical sequence of ASes. For example, a path between an AS1 and an AS3 may be represented by the sequence {AS1, AS2, AS3} when only AS2 intervenes. Based on the content of these AS sequences, the BGP protocol may filter those paths that do not coincide with the administrator's policies. As such, inter-AS routing operations are performed using only the "best paths" that satisfy the BGP policies.

Because BGP policies are applied to sequences of ASes, the policies are not able to optimize inter-AS routing in other respects, such as optimizing bandwidth utilization or minimizing cost or distance metrics. Furthermore, interior gateway protocols cannot remedy these deficiencies in the BGP protocol because they do not scale well when applied to a large number of network nodes spanning multiple ASes. For instance, the process of exchanging cost-based or distance-based routing metrics among a large number of network nodes would not only consume an unreasonable amount of network bandwidth, but also would consume an unacceptable amount of processing resources for processing those metrics to generate a convergent view of the network topology.

To address the limitations of conventional routing protocols, network administrators sometimes implement additional optimizations to improve network performance. For example, a load-balancing or cost-minimizing procedure may be used in conjunction with traditional routing protocols to redistribute data flows entering or exiting a multi-homed routing domain or AS. In some networks, border nodes located at edges of ASes, e.g., between an enterprise network and one or more Internet Service Providers (ISPs), may be configured as Optimized Edge Routers (OERs). Here each OER may be configured to periodically select an Optimal Exit Link (OEL) to each ISP for a given destination prefix (a monitored and/or controlled prefix) based on performance, load, cost, and service level agreements (SLAs) associated with connections to the ISP. Notably, a prefix, as defined generally herein, refers to a subset of nodes within the computer network. Ultimately, the end result for the enterprise network is improved Internet performance, better load distribution, and/or lower costs for Internet connections. These additional procedures may require the border nodes (OERs) to collect various network statistics associated with the data flows. An exemplary software application that may be used to collect the network statistics at the border nodes is NetFlow™ by Cisco Systems, Incorporated, which is described in more detail in the technical paper entitled *Netflow Services Solutions Guide*, published September 2002, and is hereby incorporated by reference as though fully set forth herein.

Techniques that may be used to select the OEL for the monitored prefix include passive monitoring and/or active probing. Passive monitoring relies on gathering information from OERs learned from monitoring conventional user traffic, such as throughput, timing, latency, packet loss, reachability, etc. For example, selected interfaces at one or more network nodes monitor incoming and outgoing data flows and collect various statistics for the monitored flows. Notably, interfaces may include physical interfaces, such as a port on a network interface card, and/or logical interfaces, such as virtual private networks (VPN) implemented over multiple physical interfaces. Each node stores address prefixes and statistics for the monitored data flows, which may be periodically exported to a central management node (e.g., a "collector" or "Master"). The central management node is configured to receive prefixes and statistics (e.g., for those prefixes) from a plurality of different network nodes. A record format that may be used to export the raw prefixes and statistics is described in the technical paper entitled *Netflow v9 Export Format*, which is hereby incorporated by reference in its entirety. Further, a more sophisticated interaction (e.g., a filtered and/or pre-processed information exchange) between border nodes and a Master node is described in commonly owned copending U.S. patent application Ser. No. 10/980, 550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety.

Active probing, on the other hand, relies on probe packets to measure various performance parameters associated with accessing the monitored prefix from an originating node (source). Here, the originating node may generate multiple probe packets that are then forwarded via different exit interfaces (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links.

Once the relevant statistics are obtained (e.g., at the central management node), the collected parametric (performance) information (i.e., learned from passive monitoring or active probing) is analyzed, such as either manually by a network administrator or dynamically by a software script. The analyzed information may then be used to select an OEL from among the different exits that may be used to reach the destination prefix, and/or to determine whether the data flows may be more optimally distributed. For instance, suppose an administrator desires to make more efficient use of available network bandwidth and determines that a first network interface is under-utilized and a second interface is oversubscribed. In this case, at least some data flows at the second interface may be redirected to the first interface. To effectuate such a routing change, the administrator may, for example, make static changes to the routing tables at the first and second interfaces or may re-assign local-preference values (or other priority values) associated with the data flows.

Often, the changes are made manually by an administrator, which is cumbersome in configuration and prone to errors and/or oversights. In particular, manually inserting routes into routing tables may cause the creation of routes over certain exits to unreachable destinations. Assuming that the changes made do not cause any errors, it is nevertheless difficult to determine whether the changes have any impact on the traffic flow in the network and, further, to enforce the changes.

SUMMARY OF THE INVENTION

The present invention is directed to a technique for dynamically enforcing a best exit selection for a controlled prefix based on policies and real-time performance statistics in a computer network. According to the novel technique, a Master Controller (e.g., an Optimized Edge Routing, OER, Master Controller) of an autonomous system (AS) in the network selects a best exit from the AS for the controlled prefix, and conveys the selection to a border router having the selected exit. In response, the border router performs a parent lookup to determine whether the controlled prefix is reachable via the best exit. If so, the border router influences routing in the AS for the controlled prefix through the best exit by, e.g., injecting routes or modifying metrics of existing routes. The Master Controller (or border router) then verifies that the routes for the controlled prefix traverse the selected best exit. Notably, if a route does not traverse the selected best exit, the border router may try to influence the route again or remove the influence.

In accordance with one aspect of the present invention, the border router performs the parent lookup to ensure that it does not install a route through an exit that is not reachable to the controlled prefix. To perform the parent lookup, the border router may check routing protocols for a parent prefix route through the selected best exit. As will be understood by those skilled in the art, a parent prefix may be either an exact match of the controlled prefix or a less specific prefix than the controlled prefix. The border router only attempts to influence the route of the controlled prefix if the controlled prefix is reachable from the selected best exit. Otherwise, the controlled prefix is not reachable via the selected best exit, and the border router may return an error.

In accordance with another aspect of the present invention, the border router may influence the route for the controlled prefix in a variety of manners. For example, in the case where the controlled prefix is more specific than the parent prefix, the border router may inject into its routing tables the more specific prefix and route (i.e., over the selected best exit). Alternatively, the border router may influence the route by modifying various route metrics, e.g., Interior Gateway Protocol (IGP) metrics. For instance, a local preference value (e.g., an internal Border Gateway Protocol, iBGP, local-pref) of the selected best exit may be adjusted for the controlled prefix to a more preferable value so that other routers will use the selected exit (e.g., a substantially more preferred value). As another example, a new internal static route (e.g., for static routing) may be created and tagged as a preferred route for the controlled prefix.

In accordance with yet another aspect of the present invention, the Master Controller (or border router) verifies that the network is using the selected best exit as the route for the controlled prefix, such as, e.g., by monitoring the traffic flow to the controlled prefix. Namely, statistics from traffic monitoring tools (e.g., Netflow) are collected for the controlled prefix, including, for example, the amount of traffic to the controlled prefix, particularly over which exit interfaces and to which next-hops. The statistics are compared with the best exit selection to verify that the route to the controlled prefix is the selected exit. In the event the verification fails, another attempt to influence the route may be made, such as, e.g., with higher preferences. Otherwise, the attempted influences may be removed, for example, to account for when other (e.g., unknown) routing factors are taking part in the routing decision to the controlled prefix.

Advantageously, the novel technique dynamically enforces a best exit selection for a controlled prefix based on policies and real-time performance statistics in a computer network. By ensuring reachability prior to influencing routes, the novel technique prevents the creation of routes to unreachable destinations. Also, by verifying that the route has changed in response to the influence, the novel technique can enforce the best exit selection by attempting further influence, or can deterministically concede that the best exit selection is currently unsuccessful for the controlled prefix. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
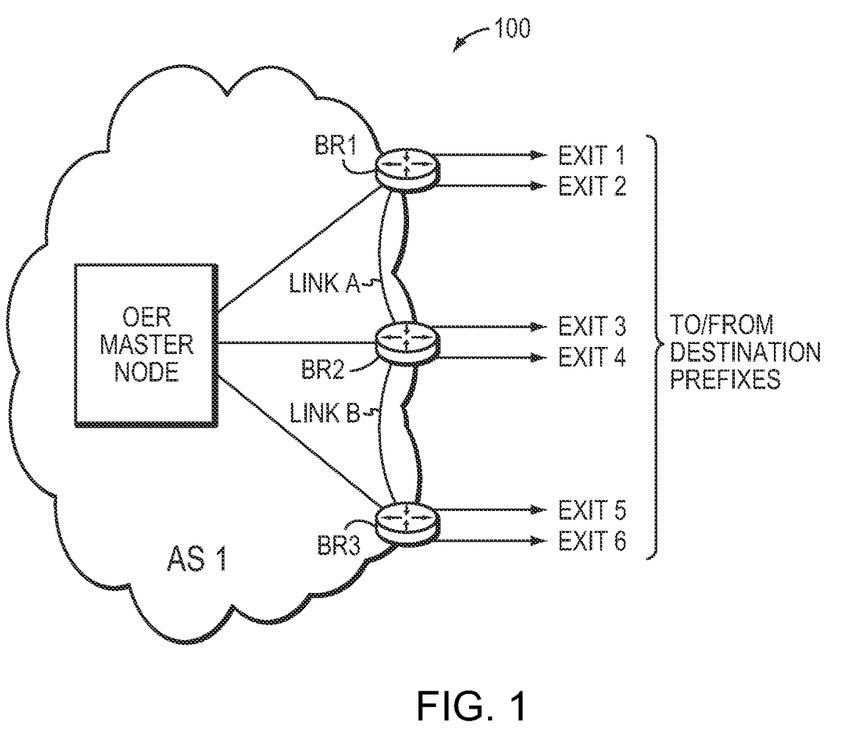
FIG. 1 is a schematic block diagram of an exemplary computer network that may be advantageously used with the present invention.

FIG. 1 is a schematic block diagram of an exemplary computer network 100 comprising an autonomous system (AS) AS1 (e.g., an enterprise or content provider network) interconnected to one or more destination prefixes (e.g., within one or more content consumer networks). Although AS1 is illustratively an autonomous system, those skilled in the art will appreciate that AS1 may be configured as one or more routing domains or other networks or subnetworks. AS1 comprises one or more network nodes, including a set of communicating border nodes (illustratively, edge or border routers, BRs) BR1, BR2, and BR3, through which client communications, such as data packet traffic, can pass into and out of the AS. For example, BR1-BR3 permit communication from AS1 to/from destination prefixes (e.g., via a wide area network, or WAN), such as through illustrative exits 1 and 2 on BR1, exits 3 and 4 on BR2, and exits 5 and 6 on BR3. Routing operations at the border nodes BR1-3 may be managed by an optimized edge routing (OER) "Master" node, which may be connected to the border nodes by, e.g., point-topoint links or a local area network. Also, BR1-BR3 may be in communication with each other, such as through illustrative links A and B as shown. These examples are merely representative. Those skilled in the art will understand that any number of routers, nodes, links, and exits may be used in the computer network and connected in a variety of ways, and that the view shown herein is for simplicity.

Data packets may be communicated by the AS and destination prefixes using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within an AS may rely on predetermined "interior" gateway protocols (IGPs), such as conventional link-state or distance-vector protocols. In addition, data packets containing network topology information may be exchanged among ASes using "external" gateway protocols, such as the Border Gateway Protocol (BGP).

Figure 2:
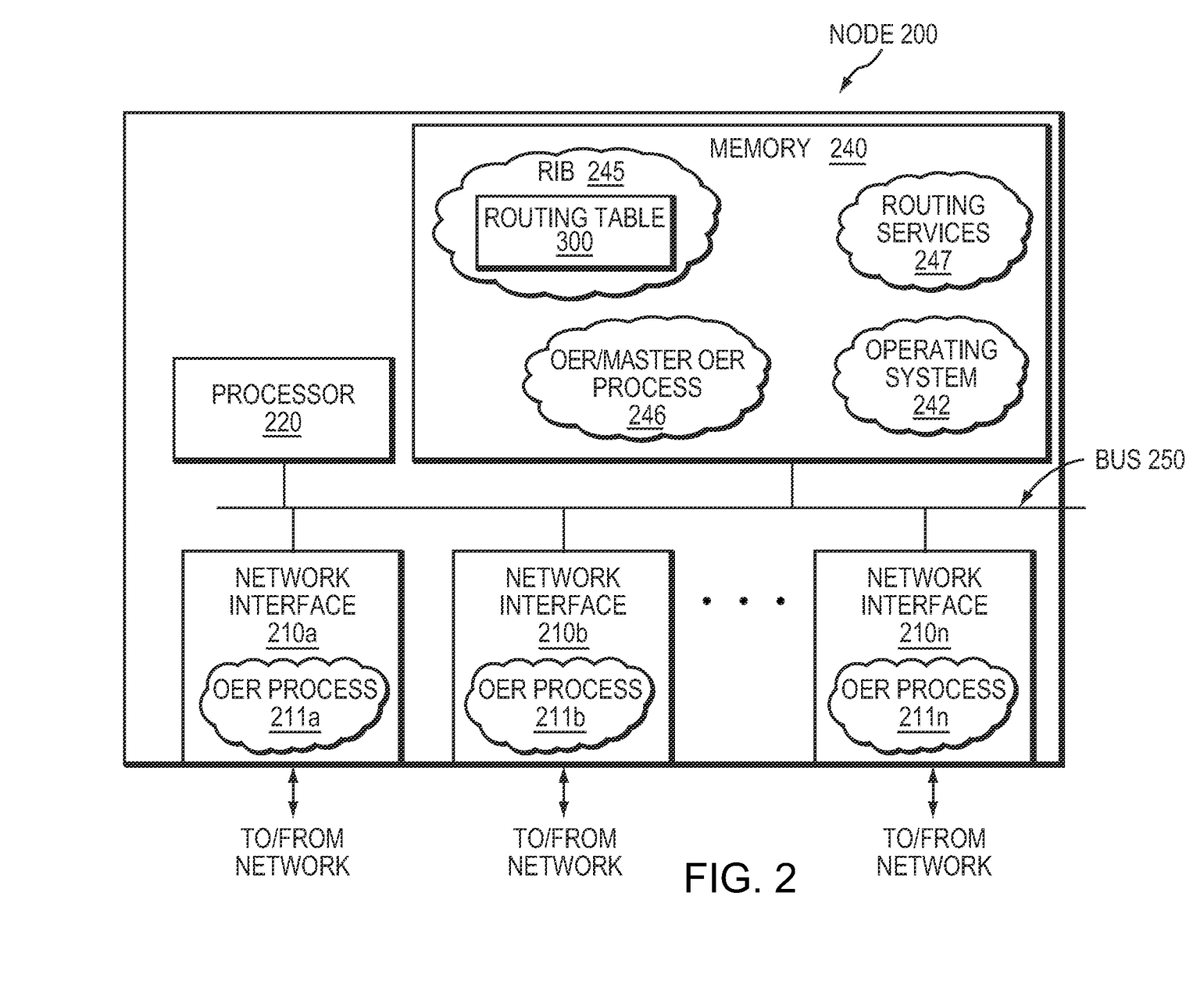
FIG. 2 is a schematic block diagram of an exemplary node that may be advantageously used with the present invention.

FIG. 2 is a schematic block diagram of an exemplary node 200 that may be advantageously used with the present invention, such as, e.g., a border node (e.g., an edge router) or a master node. The node comprises a plurality of network interfaces 210a-n (e.g., line cards), a processor 220, and a memory 240 interconnected by a system bus 250. The network interfaces 210 contain the mechanical, electrical and signaling circuitry for communicating data over physical links coupled to the network 100, and also may be adapted to process the incoming and outgoing data. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art. Both physical network interfaces and virtual network interfaces (e.g., routes out of an edge router) are referred to generally herein as "exits."

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 300. An operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Routing Information Base (RIB) 245, OER/Master OER Process 246, and routing services 247. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a forwarding information database (not shown) containing, e.g., data used to make forwarding decisions. The RIB 245 maintains copies of routes (paths) provided by the routing protocols, such as IGP or BGP, in order to compute best paths/routes for installation into the routing table 300, described below.

According to the illustrative embodiment of the present invention, the OER/Master OER Process 246 is employed by an OER node (e.g., border routers BR1-3) and an OER Master node (e.g., an OER Master router or Master Controller), respectively. The Master OER process 246 executing on the OER Master node communicates with border routers BR1-3 to request, among other things, the monitoring of a set of address prefixes. The OER processes 246 executing on the border routers monitor traffic at the edge of the AS1 and respond with, inter alia, network statistics corresponding to the monitored prefixes. Illustratively, instances of the OER process 246 execute on the network interfaces 210 as OER processes 211a-n configured to measure various types of network statistics acquired from monitored traffic. These statistics are then forwarded from the OER processes 211a-n to the OER process 246. The statistics may correspond to various traffic measurements, such as round-trip delay times, data throughput (i.e., the amount of data transferred or received), packet loss, reachability, etc. In general, the OER processes (notably, 246 and/or 211a-n) may measure any arbitrary traffic metric, including conventional cost-based and distance-based metrics. Further, the OER Process 246 and/or 211a-n may calculate statistical averages, variances, medians, etc. of a collection of traffic measurements.

Techniques for learning address prefixes and collecting traffic statistics (passively monitoring) are described in commonly-owned copending U.S. patent application Ser. No. 10/980,550, entitled METHOD AND APPARATUS FOR AUTOMATICALLY OPTIMIZING ROUTING OPERATIONS AT THE EDGE OF A NETWORK, filed by Shah et al. on Nov. 3, 2004, the contents of which are hereby incorporated in its entirety. Also, techniques for actively probing (managing paths and targets of active probe packets) are described in commonly-owned copending U.S. patent application Ser. No. 11/113,629, entitled ACTIVE PROBE PATH MANAGEMENT, filed by Blair et al. on Apr. 25, 2005, and commonly owned copending U.S. patent application Ser. No. 11/113,582, entitled ACTIVE PROBE TARGET MANAGEMENT, filed by Metzger et al. on Apr. 25, 2005, the contents of both of which are hereby incorporated in their entirety.

The statistics from the OER Process 246 and/or 211a-n are then processed at the Master node in accordance with the Master OER process 246. More specifically, the Master OER process 246 analyzes the statistics and determines whether the distribution of traffic entering and/or leaving the AS1 (or a configured subset of AS1) can be optimized, e.g., according to one or more policies. If so, the Master OER process may redistribute traffic routed through the border nodes by, e.g., associating new BGP local-preference values with selected traffic or statically changing the routing table contents of the border nodes, as described in detail below. In that sense, the Master OER process selects optimal exit links (OELs) ("best exits") to various destination prefixes. Notably, the Master OER process 246 may be distributed among a plurality of nodes, and thus need not reside in a single OER Master node. Also, it is not necessary for a single OER Master node to contain routing processes or routing tables, other than what is necessary for communication with the border nodes. Those skilled in the art will understand that while the OER Master node and OER node (e.g., a border router) are shown as separate nodes (e.g., in FIG. 1), the Master and OER node may be configured within the same node. For example, a single border router (e.g., a home office router) having multiple exits/paths may both monitor the quality of its exits and select the OEL itself.

The present invention is directed to a technique for dynamically enforcing a best exit selection for a controlled prefix based on policies and real-time performance statistics in a computer network. According to the novel technique, a Master Controller (e.g., an OER Master Controller) of an AS in the network selects a best exit from the AS for the controlled prefix, and conveys the selection to a border router having the selected exit, as described above. In response, the border router performs a parent lookup (e.g., in a routing table) to determine whether the controlled prefix is reachable via the best exit. If so, the border router influences routing in the AS for the controlled prefix through the best exit by, e.g., injecting routes or modifying metrics of existing routes. The Master Controller (or border router) then verifies that the routes for the controlled prefix traverse the selected best exit. Notably, if a route does not traverse the selected best exit, the border router may try to influence the route again or remove the influence.

In accordance with one aspect of the present invention, the border router (i.e., the border router having the selected best exit) performs the parent lookup to ensure that it does not install a route through an exit that is not reachable to the controlled prefix. The parent lookup is an additional safeguard against errors, because the creation of a route to a prefix (especially a manual creation) could possibly result in the creation of an erroneous route through an exit that is not reachable (i.e., does not have reachability) to the prefix. To perform the parent lookup, the border router may check routing protocols for a parent prefix route through the selected best exit. For example, conventional BGP and/or static routing tables (not shown) generally have a listing of which address prefixes are reachable and from which exits. These routing protocol tables, e.g., maintained by routing services 247, are normally kept up-to-date by well-known update methods.

As will be understood by those skilled in the art, a parent prefix may be either an exact match of the controlled prefix or a less specific prefix than the controlled prefix. In other words, as will be understood to those skilled in the art, the mask length ("mask_length") of the parent prefix must be less than or equal to the mask length of the controlled prefix. Briefly, a mask length, often denoted as "/N," is a representation of the number of most significant address bits shared by nodes within a certain address prefix. Therefore, a lower number of shared significant bits creates a larger prefix (e.g., /8) than does a larger number for a smaller prefix (e.g., /24). As a simple example, assume two 32-bit address prefixes, 1.1.1.0/31, and 1.1.1.0/32. Here, the /31 prefix includes addresses 1.1.1.0 and 1.1.1.1, sharing the same first 31 significant bits, while the /32 prefix only includes address 1.1.1.0, the only shared combination of all 32 bits. Because the address prefix 1.1.1.0/32 falls within the address prefix 1.1.1.0/31, the /31 prefix is said to be a "parent prefix" for the /32 prefix.

The border router (or Master Controller) only attempts to influence the route of the controlled prefix if the controlled prefix is reachable from the selected best exit. For example, assume that a prefix P1 having a mask length of /16 exists within a BGP routing table of BR1 in FIG. 1, and P1 is reachable via both exit 1 and 2. If the controlled prefix, P1', shares the same 16 significant bits as P1 (i.e., is defined within the prefix P1) and has a mask length of /24 (i.e., greater than P1), then the more specific prefix P1' is reachable via both exits 1 and 2 as well. If the controlled prefix does have a parent prefix reachable via the selected best exit, the route for the controlled prefix may be influenced to traverse the selected best exit as described below. Otherwise, such as in the case where P1 is not reachable via exit 2 and the selected best exit is exit 2, the controlled prefix P1' is also not reachable via the selected best exit. In this case, the border router BR1 may return an error to the Master Controller (e.g., Master OER Process 246), e.g., to update the best exit selection or for investigation by a system administrator.

In accordance with another aspect of the present invention, the border router may influence the route for the controlled prefix in a variety of manners. For example, in the case where the controlled prefix is more specific than the parent prefix, the border router may inject into its routing tables the more specific prefix and route (i.e., over the selected best exit). Notably, the more specific route may have the same next-hop as the parent prefix, which is be reachable through selected best exit. For instance, P1' from above may be inserted (or "injected") as a more specific prefix (e.g., /24) into a routing table (e.g., a BGP table), and any traffic destined for P1' will use the exit defined for P1', while all other traffic destined for P1 (e.g., /16) that is not within P1' will use the exit defined for P1.

Figure 3:
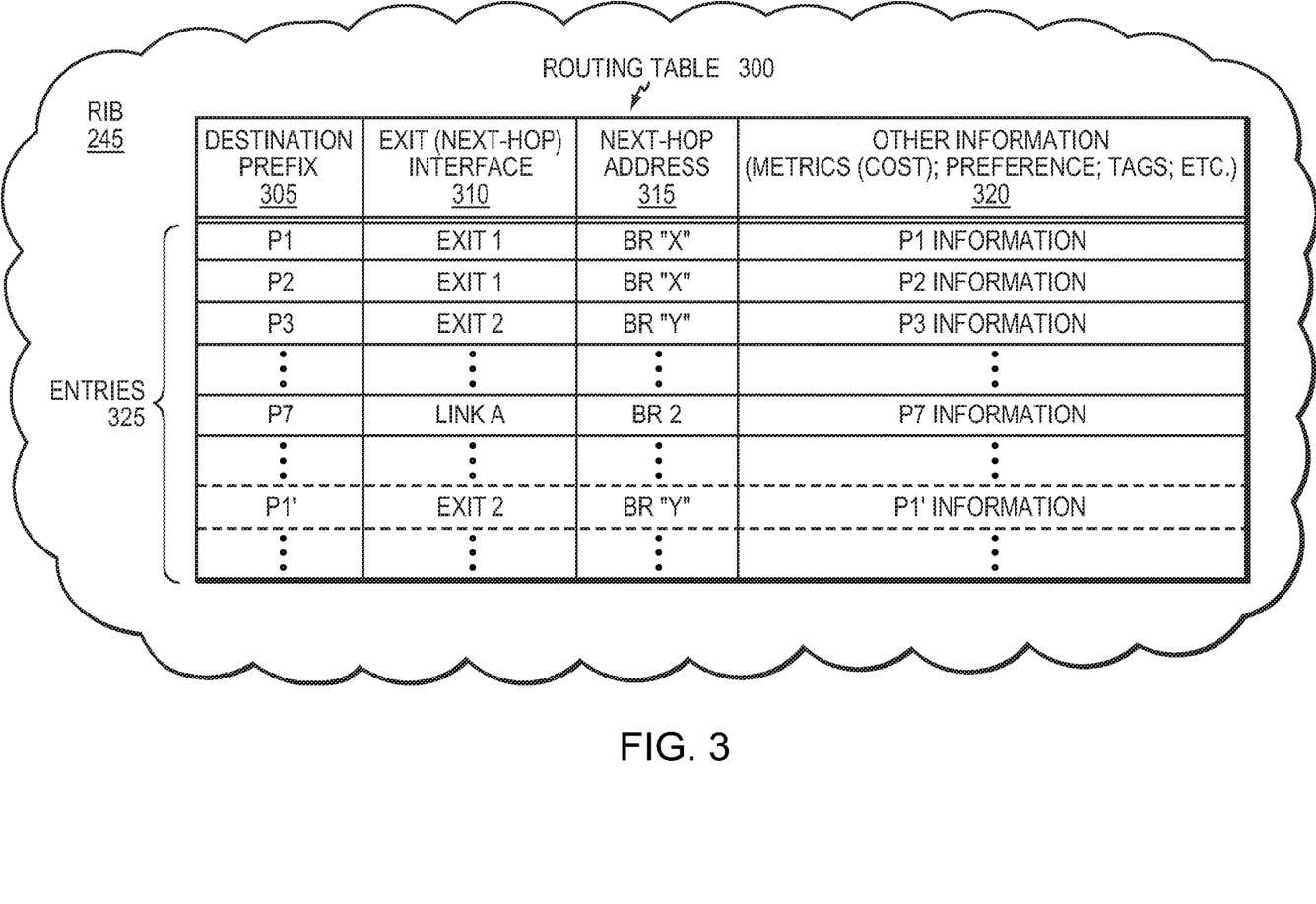
FIG. 3 is a schematic block diagram of an exemplary routing table that may be used in accordance with the present invention.

FIG. 3 is a schematic block diagram of an exemplary routing table 300 that may be used in accordance with the present invention. Routing table 300 is illustratively stored in memory 240 and includes one or more entries 325, each comprising a plurality of fields for storing a reachable destination address prefix 305, an exit (next-hop) interface 310 and next-hop address 315 to reach that destination, and optionally other information 320, such as an associated metric (e.g., cost) of reaching the destination, local preference values, tags, etc., as described herein. As noted, the routing table 300 is illustratively maintained and managed by RIB 245.

Assume that a destination address prefix P1 is reachable from border router BR1 via exit 1 through a next-hop border router BR "X" in another AS. Destination address field 305 contains the reachable address P1, and the exit interface and next-hop field 310 and 315, are populated with, e.g., exit 1 and a loopback address of node BR "X", respectively. Note that a loopback address of the next-hop node is used as the next-hop address for many reasons, including as a way to avoid depending upon the availability of network interfaces of that node. The other information field 320 may contain the cost of reaching P1, such as the cost of all links to the reachable address, or a local preference value, or a tag, as described herein, according to the configuration of the routing table (e.g., an IGP, BGP, or static routing table/entry), as will be understood by those skilled in the art. Other entries 325 may contain other reachable addresses and corresponding information as shown. For instance, the entry 325 for inserted route for P1' appears in a dashed box with corresponding selected best exit, e.g., exit 2, and other appropriate information. Notably, one or more prefixes (e.g., P7) may have exits through other border routers, so their exit interfaces 310 may be an internal exit (e.g., Link A) to other border routers (e.g., BR2). Those skilled in the art will understand that routing table 300 is merely representative and is used for illustrative purposes herein, and that other tables, table configurations, or tables for other routing protocols may be used in accordance with the present invention.

Alternatively, the border router may influence the route by modifying various route metrics, e.g., IGP metrics. For instance, a local preference value (e.g., an internal BGP, iBGP, local-pref) of the selected best exit may be adjusted for the controlled prefix to a more preferable value so that other routers will use the selected exit (e.g., a substantially more preferred value). For example, in the event that P1' already exists within the routing table 300 with a default local preference value (in field 320) of, e.g., 100, OER process 246 may increase the preference value to, e.g., 5000 (a much more preferable value). When route updates are subsequently forwarded to iBGP peers within AS1, the peers will more likely than not update their routes for P1' to exit the AS via exit 2. As noted, where routing table 300 is a BGP table, more than one entry may exist for each prefix as the prefix may be reachable via more than one exit. In this example, the selected exit may be given the most preferable preference value out of the plurality of exits accordingly.

As another example, a new internal static route (e.g., for static routing) may be created and tagged as a preferred route for the controlled prefix. Also, a new static route may be created and redistributed into local IGP tables and update messages with metrics specific to individual IGPs (e.g., OSPF, IS-IS, etc.). (As will be understood by those skilled in the art, route maps may be required for this type of redistribution.) For instance, a static route with a substantially lower cost metric or one with another favorable metric used for route determination may be used. Other means for influencing the route of the controlled prefix to utilize the selected best exit may be applied by the OER process 246 as will be understood by those skilled in the art, and those mentioned above are merely representative.

Notably, these influences (e.g., metric/preference changes, injected routes, etc.) may be initiated at each of the border routers of the AS (i.e., BR1-3) to indicate the best selected exit on any one of the border routers. Alternatively, the border router having the best selected exit may initiate the influences and, through conventional routing updates, inform the other border routers of the changes. This is also true for other routers and nodes within the AS (not shown), such that they, too, may forward traffic to the appropriate border router having the selected best exit. However, it is also important to note that it may be desirable not to distribute some or all of the influenced routes (e.g., new routes, changed metrics/preferences, etc.) outside of the controlled domain (e.g., the enterprise network AS1) for various reasons that will be understood by those skilled in the art, such as confidentiality or other proprietary reasons. For example, a BGP advertisement may include the new routes/preferences with a conventional "no-export" indication, so that the influential information is not advertised beyond any exits to other ASes.

In accordance with yet another aspect of the present invention, the Master Controller (or border router) verifies that the network is using the selected best exit as the route for the controlled prefix, such as, e.g., by monitoring the traffic flow to the controlled prefix. Namely, statistics from traffic monitoring tools (e.g., Netflow or other traffic monitoring processes) are collected for the controlled prefix, including, for example, the amount of traffic to the controlled prefix, particularly over which exit interfaces and to which next-hops. Using the example described above, assume that the Master OER process 246 has selected exit 2 for traffic destined to prefix P1'. The traffic monitoring process (e.g., OER processes 246) collects statistics for traffic destined to prefix P1' from all available exits, exits 1-6.

The collected statistics are compared with the best exit selection to verify that the route to the controlled prefix is the selected exit. For instance, if the statistics indicate that substantially all the traffic destined for the controlled prefix (P1') utilizes the selected best exit (exit 2), then the influence is verified. Those skilled in the art will understand that a configurable threshold of traffic (e.g., 80% or 90%) may be sufficient to verify that the influence has effectively changed (diverted) the traffic flow to the selected best exit. On the other hand, if a certain amount of the traffic destined for the controlled prefix (P1') utilizes one or more exits other than the selected best exit (e.g., any or more than 10% or 20%, as mentioned above), then the verification fails, and the influence was not adequately effective.

In the event the verification fails, another attempt to influence the route may be made, such as, e.g., with higher preferences. Other and/or additional attempts may also be made, as will be understood by those skilled in the art, until the influences change the route for the controlled prefix (P1') to traverse the selected best exit (exit 2). For instance, another attempt at the same preference may be made after a configured delay (e.g., a "backoff time"). Notably, the number of other and/or additional attempts are configurable, e.g., making one additional attempt. Alternatively, or after the configurable number of additional attempts are made, upon failing to verify the influence, any attempted influences may be removed, for example, to account for when other (e.g., unknown) routing factors participate in the routing decision to the controlled prefix. For example, another process may be controlling the exits to the controlled prefix, of which OER process 246 is unable to detect. When this is case, the influences may be removed (e.g., resetting the preference value to the default preference or removing static routes, etc.) so as not to leave remnants of the influences, and the OER process 246 may generate an error, such as for further investigation by a system administrator.

Notably, as will be apparent to those skilled in the art, since the parent prefix route is closely coupled with the influenced route (e.g., more specific route) of the controlled prefix, in the case of system failures, routing will fall back to traditional routing without creating much disturbance to the network. Moreover, if network topology changes (e.g., BGP updates, such as adding or removing reachability), OER process 246 may learn of the change and may update the best exit selection or route influences described above. Particularly, the OER process 246 may learn of the change based on communication among processes of the node (e.g., directly from the BGP message), or based on traffic changes in the network.

Figure 4:
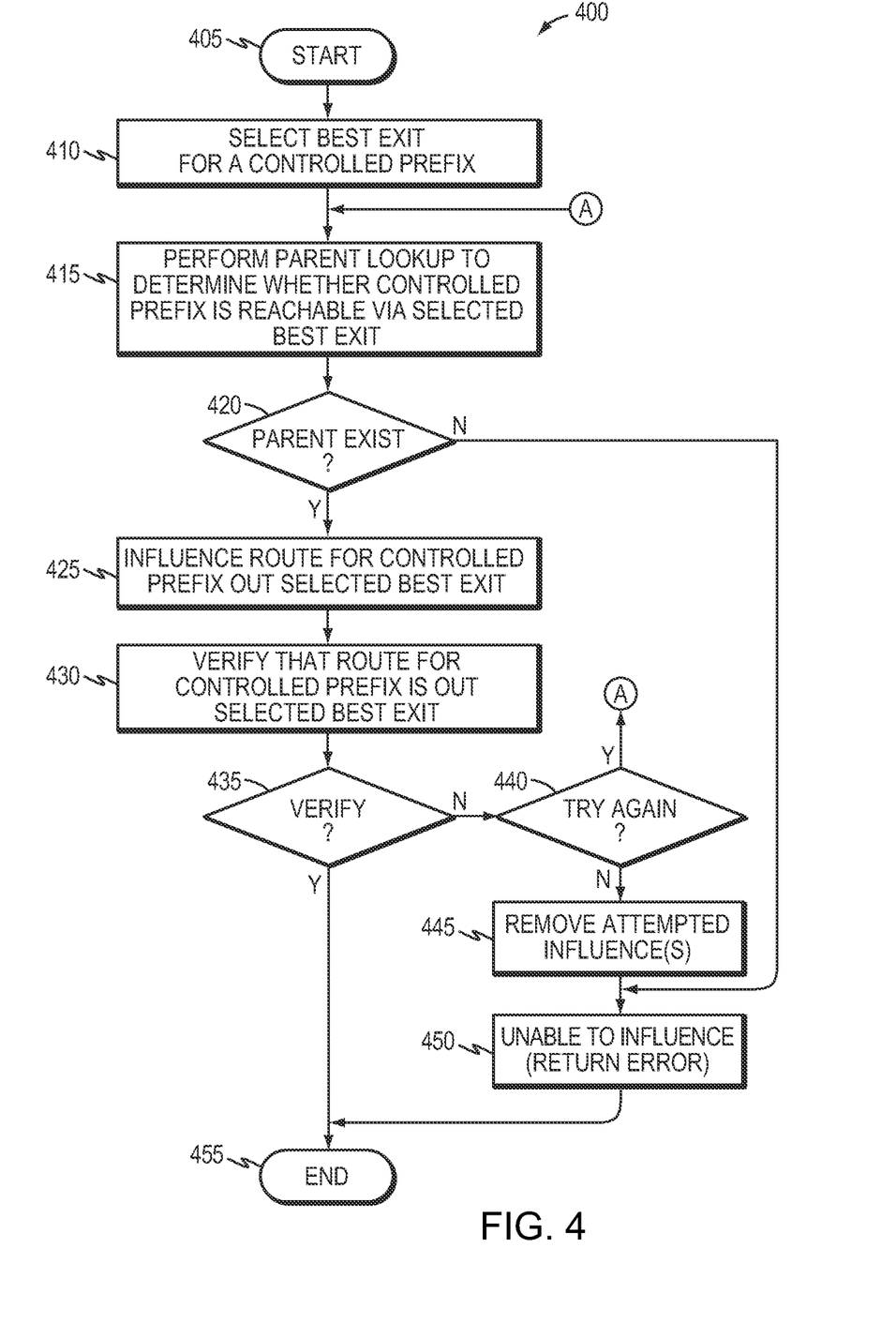
FIG. 4 is a flowchart illustrating a procedure for dynamically enforcing a best exit selection for a controlled prefix based on policies and real-time performance statistics in accordance with the present invention.

FIG. 4 is a flowchart illustrating a procedure for dynamically enforcing a best exit selection for a controlled prefix based on policies and real-time performance statistics in accordance with the present invention. The procedure 400 starts at step 405, and continues to step 410, where a best exit is selected for a controlled prefix, e.g., by the OER Master process 246, as described above. The OER process (e.g., at the border node) then performs a parent lookup at step 415 to determine whether the controlled prefix is reachable via the selected best exit. If a parent does not exist for the controlled prefix in step 420, OER process 246 is unable to influence the route for the controlled prefix over (i.e., out) the selected exit, in step 450, and may return an appropriate error. The procedure then ends at step 455.

If, however, a parent does exist in step 420, OER process 246 attempts to influence the route for the controlled prefix out the selected best exit in step 425, such as through the techniques described above. Upon attempting to influence the route, in step 430 the OER process verifies that the route for the controlled prefix currently used by the network is actually the selected best exit, such as, e.g., by monitoring traffic flow. If the route for the selected best exit is verified at step 435, the influence is successful, and the procedure ends at step 455 (i.e., with traffic to the controlled prefix travelling over the selected best exit). If, on the other hand, the route is not verified at step 435, the OER process 246 may try to influence the route again in step 440, in which case the procedure returns to step 415 to confirm that a parent still exists (e.g., in case of routing changes). Notably, those skilled in the art will understand that when OER process 246 tries to influence the route again in step 440, it may also do so without performing the parent lookup (i.e., returning to step 425). Alternatively at step 440, such as, e.g., after a configurable number of retries, OER process 246 may remove the attempted influence(s) at step 445. Once any influences are removed, the OER process 246 may still be unable to influence the route in step 450, e.g., due to unknown reasons and, as a result, may return an error. The procedure then ends at step 455.

Advantageously, the novel technique dynamically enforces a best exit selection for a controlled prefix based on policies and real-time performance statistics in a computer network. By ensuring reachability prior to influencing routes, the novel technique prevents the creation of routes to unreachable destinations. Also, by verifying that the route has changed in response to the influence, the novel technique can enforce the best exit selection by attempting further influence, or can deterministically concede that the is best exit selection is currently unsuccessful for the controlled prefix. Further, the dynamic nature of the novel technique alleviates the need for cumbersome manual configuration.

While there has been shown and described an illustrative embodiment that dynamically enforces a best exit selection for a controlled prefix based on policies and real-time performance statistics in a computer network, it is to be understood that various other adaptations and modifications may be made within the spirit and scope of the present invention. For example, the invention has been shown and described herein for enforcing best path selection for a controlled prefix. However, the invention in its broader sense is not so limited, and may, in fact, be used to enforce any kind of computer network selection, such as a best of a plurality of data/file servers (e.g., based on workload, response time, etc.), computers, applications, processes, etc., as will be understood by those skilled in the art. Also, while the invention has been shown and described for enforcing a single best exit selection, the invention may, in fact, be used to enforce the selection of multiple best exits, e.g., for load balancing, etc., as will be understood by those skilled in the art. Further, those skilled in the art will understand that the term "exit" as used herein may indicate either a physical exit or virtual exit.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   determining a best exit from an autonomous system (AS) for a controlled prefix;
   influencing, by a network device of the AS, a route for the controlled prefix to be over the best exit;
   collecting traffic statistics for the controlled prefix;
   verifying, based on the traffic statistics, whether the influencing has caused at least a configured amount of traffic for the controlled prefix to be over the best exit; and
   when at least the configured amount of the traffic is not directed over the best exit, further influencing, by the network device, the route for the controlled prefix to be over the best exit.

2. The method of claim 1, further comprising:
   verifying the further influencing has caused at least the configured amount of traffic for the prefix to be over the best exit; and
   when at least the configured amount of the traffic is not directed over the best exit after the further influencing, removing any influence on the route for the controlled prefix to be over the best exit.

3. The method of claim 1, further comprising:
   performing a parent lookup that looks to a parent prefix of the controlled prefix to determine whether the controlled prefix is reachable via the best exit; and
   performing the influencing in response to the parent lookup indicating the controlled prefix is reachable via the best exit.

4. The method of in claim 3, further comprising:
   performing the parent lookup by checking whether a route for the parent prefix is over the best exit.

5. The method of claim 3, wherein the parent prefix is a prefix that is less specific than the controlled prefix.

6. The method of claim 1, wherein the influencing comprises:
   injecting the controlled prefix into a routing table, the controlled prefix being more specific than a parent prefix already in the routing table.

7. The method of claim 1, wherein the influencing comprises:
   modifying one or more metrics of the route for the controlled prefix.

8. The method of claim 7, wherein the modifying comprises:
   changing a default local preference value for the route of the controlled prefix over the best exit to a higher local preference value.

9. The method of claim 8, wherein the local preference value is an internal Border Gateway Protocol (iBGP) local preference value.

10. An apparatus comprising:
    one or more network interfaces;
    a processor coupled to the one or more network interfaces and configured to execute software processes; and
    a memory configured to store a best exit selection enforcement process executable by the processor that, when executed, is operable to:
       determine a best exit from an autonomous system (AS) for a controlled prefix,
       influence a route for the controlled prefix to be over the best exit,
       collect traffic statistics for the controlled prefix,
       verify, based on the traffic statistics, whether the influence has caused at least a configured amount of traffic for the controlled prefix to be over the best exit, and
       when at least the configured amount of the traffic is not directed over the best exit, further influence the route for the controlled prefix to be over the best exit.

11. The apparatus of claim 10, wherein the best exit selection enforcement process, when executed, is further operable to:

verify the further influence has caused at least the configured amount of traffic for the prefix to be over the best exit, and when at least the configured amount of the traffic is not directed over the best exit after the further influence, remove any influence on the route for the controlled prefix to be over the best exit.

12. The apparatus of claim 10, wherein the best exit selection enforcement process, when executed, is further operable to:

perform a parent lookup that looks to a parent prefix of the controlled prefix to determine whether the controlled prefix is reachable via the best exit.

13. The apparatus of claim 12, wherein the parent lookup includes a check of whether a route for the parent prefix is over the best exit.

14. The apparatus of claim 12, wherein the parent prefix is a prefix that is less specific than the controlled prefix.

15. The apparatus of claim 10, wherein the influence comprises injection of the controlled prefix into a routing table, the controlled prefix being more specific than a parent prefix already in the routing table.

16. The apparatus of claim 10, wherein the influence comprises modification of one or more metrics of the route for the controlled prefix.

17. The apparatus of claim 10, wherein the modification comprises a change to a default local preference value for the route of the controlled prefix over the best exit to a higher local preference value.

18. The apparatus of claim 10, wherein the local preference value is an internal Border Gateway Protocol (iBGP) local preference value.

19. A non-transitory computer-readable medium that includes instructions executable on a processor, the instructions, when executed, operable to:

determine an exit from an autonomous system (AS) for a controlled prefix;

influence a route for the controlled prefix to be over the exit;

verify whether the influence has caused at least a configured amount of traffic for the controlled prefix to be over the exit; and when at least the configured amount of the traffic is not directed over the best exit, further influence the route for the controlled prefix to be over the exit.

20. The non-transitory computer-readable medium of claim 19, wherein the instructions, when executed, are further operable to:

verify the further influence has caused at least the configured amount of traffic for the prefix to be over the exit; and when at least the configured amount of the traffic is not directed over the best exit after the further influence, remove any influence on the route for the controlled prefix to be over the exit.

\* \* \* \* \*